US012638401B2

(12) United States Patent
Wang et al.

(10) Patent No.: US 12,638,401 B2
(45) Date of Patent: May 26, 2026

(54) METHOD AND DEVICE FOR DETECTING DEFECT OF ELECTRODE ASSEMBLY, AND COMPUTER-READABLE STORAGE MEDIUM

(71) Applicant: CONTEMPORARY AMPEREX TECHNOLOGY (HONG KONG) LIMITED, Hong Kong (CN)

(72) Inventors: Zhiyu Wang, Ningde (CN); Xi Wang, Ningde (CN); Guannan Jiang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 420 days.

(21) Appl. No.: 18/225,222

(22) Filed: Jul. 24, 2023

(65) Prior Publication Data

US 2024/0094137 A1 Mar. 21, 2024

Related U.S. Application Data

(63) Continuation of application No. PCT/CN2023/085201, filed on Mar. 30, 2023.

(30) Foreign Application Priority Data

Sep. 16, 2022 (CN) .......................... 202211132007.X

(51) Int. Cl.
*G01N 21/88* (2006.01)

(52) U.S. Cl.
CPC . *G01N 21/8851* (2013.01); *G01N 2021/8887* (2013.01)

(58) Field of Classification Search
CPC ...... G01N 21/8851; G06T 2207/30164; G06T 7/0004
See application file for complete search history.

(56) References Cited

U.S. PATENT DOCUMENTS 11,657,494 B1* 5/2023 Zhao ..................... G06V 10/60
348/106
2017/0277966 A1 9/2017 Abousleman et al.
(Continued)

FOREIGN PATENT DOCUMENTS

CN 108037130 A 5/2018
CN 110824371 A 2/2020
(Continued)

OTHER PUBLICATIONS

International Search Report and Written Opinion mailed on Jun. 23, 2023, received for PCT Application PCT/CN2023/085201, filed on Mar. 30, 2023, 17 pages including English Translation.
(Continued)

*Primary Examiner* — Benjamin O Dulaney
(74) *Attorney, Agent, or Firm* — XSENSUS LLP

(57) ABSTRACT

An embodiment of this application discloses a method and device for detecting a defect of an electrode assembly, and a computer-readable storage medium. The method may include: determining a first segmented image of an electrode assembly body in an electrode assembly image based on a first preset threshold; determining a second segmented image of a tab in the electrode assembly image based on a second preset threshold, where the second preset threshold is less than the first preset threshold; and determining defect status of the electrode assembly based on the first segmented image and the second segmented image.

14 Claims, 6 Drawing Sheets

Determine a first segmented image of an electrode assembly body in an electrode assembly image based on a first preset threshold; and determine a second segmented image of a tab in the electrode assembly image based on a second preset threshold, where the second preset threshold is less than the first preset threshold — 210

Determine defect status of the electrode assembly based on the first segmented image and the second segmented image — 220

(56)  References Cited

U.S. PATENT DOCUMENTS

| | | | |
|---|---|---|---|
| 2021/0209739 A1* | 7/2021 | Wen .................. | H01M 10/4285 |
| 2023/0109910 A1* | 4/2023 | Bruder ...................... | B60L 3/12 |
| | | | 702/63 |
| 2023/0126524 A1* | 4/2023 | Jung ................. | H01M 10/0404 |
| | | | 156/250 |
| 2025/0278840 A1* | 9/2025 | Kim .......................... | G06T 7/12 |

FOREIGN PATENT DOCUMENTS

| | | |
|---|---|---|
| CN | 112557390 A | 3/2021 |
| CN | 111193072 B | 4/2021 |
| CN | 112669295 A | 4/2021 |
| CN | 113409296 A | 9/2021 |
| CN | 113989232 A | 1/2022 |
| CN | 114627092 A | 6/2022 |
| CN | 114764804 A | 7/2022 |
| CN | 115829921 A | 3/2023 |

OTHER PUBLICATIONS

Office Action mailed on Jun. 9, 2023, received for Chinese Application 202211132007.X, 13 pages including English Translation.

* cited by examiner

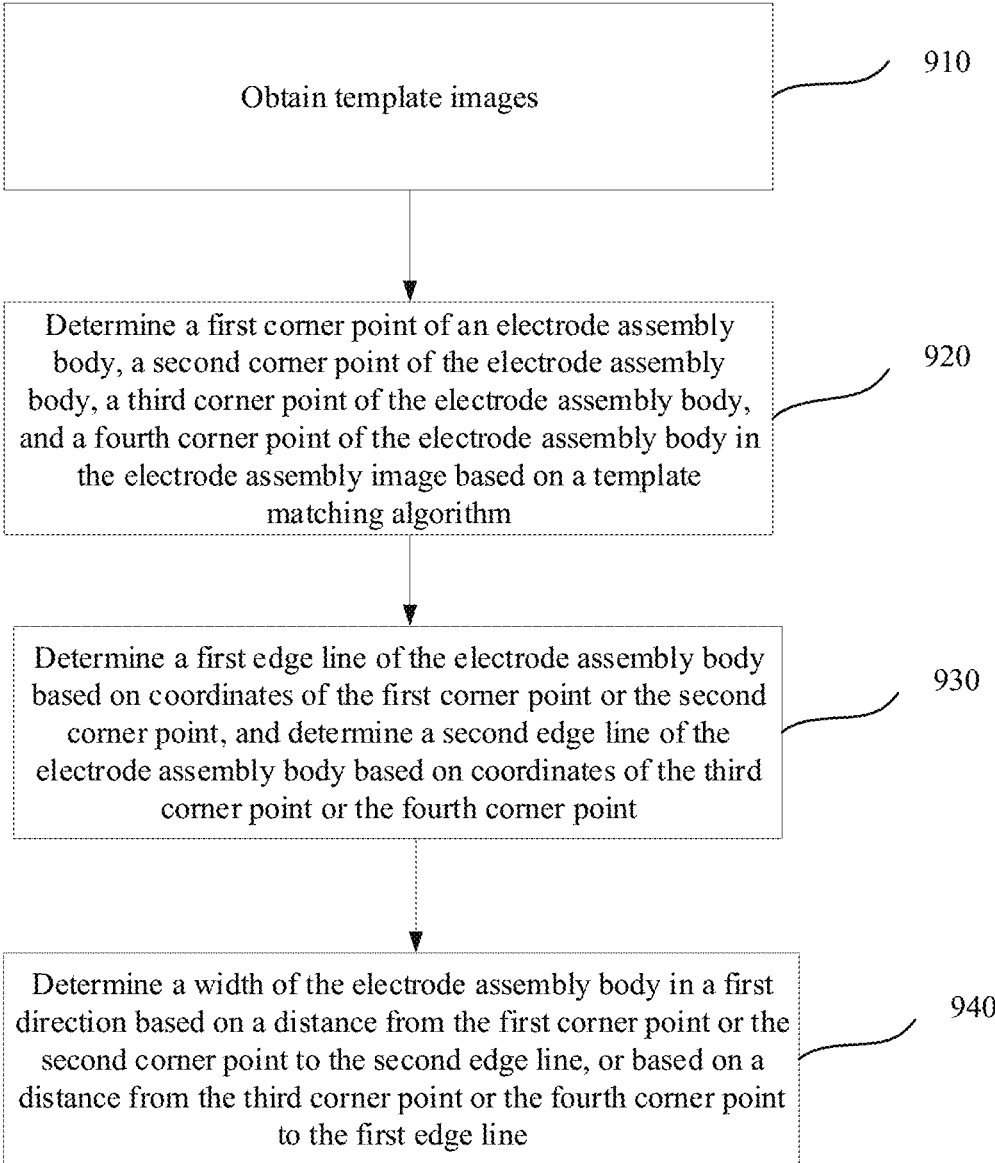

Obtain template images — 910

Determine a first corner point of an electrode assembly body, a second corner point of the electrode assembly body, a third corner point of the electrode assembly body, and a fourth corner point of the electrode assembly body in the electrode assembly image based on a template matching algorithm — 920

Determine a first edge line of the electrode assembly body based on coordinates of the first corner point or the second corner point, and determine a second edge line of the electrode assembly body based on coordinates of the third corner point or the fourth corner point — 930

Determine a width of the electrode assembly body in a first direction based on a distance from the first corner point or the second corner point to the second edge line, or based on a distance from the third corner point or the fourth corner point to the first edge line — 940

FIG. 8

METHOD AND DEVICE FOR DETECTING DEFECT OF ELECTRODE ASSEMBLY, AND COMPUTER-READABLE STORAGE MEDIUM

CROSS-REFERENCE TO RELATED APPLICATIONS

This application is a continuation of International Application No. PCT/CN2023/085201, filed Mar. 30, 2023, which claims priority to Chinese Patent Application No. 202211132007.X, filed on Sep. 16, 2022 and entitled "METHOD AND DEVICE FOR DETECTING DEFECT OF ELECTRODE ASSEMBLY, AND COMPUTER-READABLE STORAGE MEDIUM", each of which is incorporated herein by reference in its entirety.

TECHNICAL FIELD

This application relates to the field of electrode assembly inspection, and in particular, to a method and device for detecting a defect of an electrode assembly, and a computer-readable storage medium.

BACKGROUND

With the development of image processing technology, more and more image processing technologies are applied to industrial inspection. For example, defect status of the electrode assembly is determined based on an image of the electrode assembly.

However, during electrode assembly inspection, as affected by ambient light, some regions in the image of the electrode assembly are unduly dark, making it difficult to obtain complete image information of the electrode assembly and accurately detect the defects of the electrode assembly.

SUMMARY

Some embodiments of this application provide a method and device for detecting a defect of an electrode assembly, and a computer-readable storage medium, so as to obtain the complete image information of the electrode assembly, and in turn, detect defects of the electrode assembly accurately.

According to a first aspect, a method for detecting a defect of an electrode assembly is provided, including: determining a first segmented image of an electrode assembly body in an electrode assembly image based on a first preset threshold; determining a second segmented image of a tab in the electrode assembly image based on a second preset threshold, where the second preset threshold is less than the first preset threshold; and determining defect status of the electrode assembly based on the first segmented image and the second segmented image.

In an embodiment of this application, the first preset threshold is greater than the second preset threshold. Therefore, the first segmented image determined based on the first preset threshold includes the image information of a relatively bright region (electrode assembly body) in the electrode assembly image, and the second segmented image determined based on the second preset threshold includes the image information of a relatively dark region (tab) in the electrode assembly image. The first segmented image and the second segmented image include the image information of different parts of the electrode assembly respectively. In this way, the defect status of the electrode assembly can be effectively detected based on the image information of the first segmented image and the second segmented image.

In some possible implementations, the determining defect status of the electrode assembly based on the first segmented image and the second segmented image includes: determining an overall image of the electrode assembly based on the first segmented image and the second segmented image, where the overall image includes the electrode assembly body and the tab; and determining the defect status of the electrode assembly based on the overall image.

In an embodiment of this application, the overall image includes the information on two parts: the electrode assembly body and the tab. Therefore, the defect status of the electrode assembly can be determined more effectively based on both the information on the electrode assembly body and the information on the tab in the overall image.

In some possible implementations, the determining the defect status of the electrode assembly based on the overall image includes: determining information on an inflection point of the tab based on the overall image, where the inflection point of the tab is an endpoint of a connecting line between the tab and the electrode assembly body; and determining the defect status of the electrode assembly based on the information on the inflection point of the tab.

In an embodiment of this application, the positional relationship between the inflection point of the tab and the electrode assembly body in the overall image is more stable and intuitive, and a location of the inflection point of the tab in the overall image is highly correlated with a location of a defect in the electrode assembly. Therefore, the defect of the electrode assembly can be determined effectively and accurately based on the information on the inflection point of the tab.

In some possible implementations, the determining information on an inflection point of the tab based on the overall image includes: determining a statistic chart of a pixel sum in a first direction based on the overall image, where the first direction is perpendicular to a direction of a first edge line of the electrode assembly body, and the first edge line of the electrode assembly body is an edge line of the electrode assembly body at an end close to the tab in the overall image; and determining the information on the inflection point of the tab based on the statistic chart of the pixel sum in the first direction.

In an embodiment of this application, the statistic chart of the pixel sum in the first direction in the overall image can intuitively and conveniently reflect height information of the electrode assembly, and an obvious height difference exists between two sides of the inflection point of the tab. Therefore, by determining the information on the inflection point of the tab based on the statistic chart of the pixel sum in the first direction, it is simple and effective to obtain the information on the inflection point of the tab.

In some possible implementations, the determining the information on the inflection point of the tab based on the statistic chart of the pixel sum in the first direction includes: determining the information on the inflection point of the tab based on a first statistic chart of the pixel sum of a first target region in the first direction, where the first target region is a region between the first edge line of the electrode assembly body in the overall image and a first boundary line of the overall image, and the first boundary line of the overall image is a boundary line of the overall image at an end close to the tab.

In an embodiment of this application, the first target region includes the height information of the tab and the first edge line, but does not cover the width information of the electrode assembly body. Therefore, the first statistic chart can more intuitively reflect the height of the tab, so as to facilitate more effective determining of the information on the inflection point of the tab.

In some possible implementations, the determining the information on the inflection point of the tab based on a first statistic chart of the pixel sum of a first target region in the first direction in the overall image includes: determining the information on the inflection point of the tab based on a bump in the first statistic chart.

In an embodiment of this application, the bump in the first statistic chart can intuitively reflect the information on the inflection point of the tab. Therefore, by determining the information on the inflection point of the tab based on the bump in the first statistic chart, it is more intuitive and convenient to obtain the information on the inflection point of the tab.

In some possible implementations, the inflection point of the tab includes a first inflection point and a second inflection point of a first tab along the first edge line, and a first inflection point and a second inflection point of a second tab. The determining the defect status of the electrode assembly based on the information on the inflection point of the tab includes: determining, based on values corresponding to a first segment, a second segment, and a third segment of the first edge line in the first statistic chart, whether the electrode assembly includes a separator protrusion defect. The first segment is a segment between a first corner point of the electrode assembly body and the first inflection point of the first tab. The second segment is a segment between the second inflection point of the first tab and the first inflection point of the second tab. The third segment is a segment between the second inflection point of the second tab and a second corner point of the electrode assembly body. The first corner point is a corner point close to the first tab on the first edge line of the electrode assembly body, and the second corner point is a corner point close to the second tab on the first edge line of the electrode assembly body.

In an embodiment of this application, the values corresponding to the first segment, the second segment, and the third segment of the first edge line intuitively reflect the pixels in a place prone to separator protrusion in the electrode assembly. Therefore, based on the values corresponding to the first segment, the second segment, and the third segment of the first edge line, it is intuitive and convenient to determine whether the electrode assembly includes a separator protrusion defect, and to determine the location of the separator protrusion defect in the electrode assembly.

In some possible implementations, the determining, based on values corresponding to a first segment, a second segment, and a third segment of the first edge line in the first statistic chart, whether the electrode assembly includes a separator protrusion defect, includes: determining, in a case that one of values corresponding to the first segment, the second segment, and the third segment respectively is greater than or equal to a preset threshold, that the electrode assembly includes the separator protrusion defect; or, determining, in a case that all values corresponding to the first segment, the second segment, and the third segment are less than a preset threshold, that the electrode assembly includes no separator protrusion defect.

In an embodiment of this application, the values corresponding to the first segment, the second segment, and the third segment can directly reflect a distance between the separator and the first edge line of the electrode assembly body. Therefore, based on the relationship between the preset threshold and the values corresponding to the first segment and the third segment, it is practicable to determine whether the electrode assembly includes a separator protrusion defect, and it is convenient to directly obtain the information on the protrusion height of the separator.

In some possible implementations, the determining the defect status of the electrode assembly based on the overall image includes: determining the defect status of the electrode assembly based on a second statistic chart of a pixel sum of a second target region in a second direction. The second direction is perpendicular to a direction of a second edge line of the electrode assembly body. The second target region is a region between the second edge line of the electrode assembly body in the overall image and a second boundary line of the overall image. The second edge line of the electrode assembly body is an edge line of the electrode assembly body at an end away from the tab. The second boundary line is a boundary line of the overall image at an end away from the tab.

In an embodiment of this application, the second statistic chart of the pixel sum of the second target region in the second direction in the overall image reflects the protrusion of the separator of the electrode assembly body on the side away from the tab. Therefore, the defect status of the electrode assembly is determined based on the second statistic chart of the pixel sum of the second target region in the second direction in the overall image, so that the separator protrusion defect of the electrode assembly can be detected more comprehensively.

In some possible implementations, the determining the defect status of the electrode assembly based on a second statistic chart of a pixel sum of a second target region in a second direction in the overall image includes: determining, based on a value corresponding to the second edge line in the second statistic chart, whether the electrode assembly includes a separator protrusion defect.

In an embodiment of this application, the value corresponding to the second edge line is proportional to the protrusion height of the separator of the electrode assembly, and the coordinates of the value corresponding to the second edge line correspond to the coordinates of the location of the separator protrusion of the electrode assembly. Therefore, based on the value corresponding to the second edge line in the second statistic chart, it can be determined whether the electrode assembly includes a separator protrusion defect, and in addition, the location of the separator protrusion can be determined.

In some possible implementations, the determining, based on a value corresponding to the second edge line in the second statistic chart, whether the electrode assembly includes a separator protrusion defect includes: determining, in a case that the value corresponding to the second edge line is greater than or equal to a preset threshold, that the electrode assembly includes the separator protrusion defect; or, determining, in a case that the value corresponding to the second edge line is less than a preset threshold, that the electrode assembly includes no separator protrusion defect.

In an embodiment of this application, the status of the separator of the electrode assembly is determined by checking whether the value corresponding to the second edge line is greater than or equal to a preset threshold, thereby not only determining whether a separator defect exists in the electrode assembly, but also determining the protrusion height of the separator of the electrode assembly.

In some possible implementations, the method for detecting a defect of an electrode assembly further includes: determining a width of the electrode assembly body in a first direction in the electrode assembly image, where the first direction is perpendicular to a direction of a first edge line of the electrode assembly body, and the first edge line of the electrode assembly body is an edge line of the electrode assembly body at an end close to the tab in the overall image; and determining, based on the width, whether the electrode assembly includes a separator dislocation defect.

In an embodiment of this application, the separator dislocation defect is determined based on the width of the electrode assembly body in the first direction in the electrode assembly image, it is convenient to determine whether a separator dislocation defect occurs in the electrode assembly, so as to determine more types of defects of the electrode assembly.

In some possible implementations, the determining, based on the width, whether the electrode assembly includes a separator dislocation defect includes: determining, in a case that the width exceeds a preset range, that the electrode assembly includes the separator dislocation defect; or, determining, in a case that the width does not exceed a preset range, that the electrode assembly includes no separator dislocation defect.

In an embodiment of this application, the separator dislocation status is determined depending on whether the width exceeds the preset range, thereby not only determining whether a separator dislocation occurs in the electrode assembly, but also determining the width of the separator dislocation in the electrode assembly.

In some possible implementations, the determining a width of the electrode assembly body in a first direction in the electrode assembly image includes: determining to a corner point of the electrode assembly body; and determining the width based on the corner point of the electrode assembly body.

In an embodiment of this application, the position of the corner point of the electrode assembly body is relatively stable. Therefore, the width can be obtained accurately based on the corner point, thereby determining the separator dislocation status of the electrode assembly more accurately.

According to a second aspect, a device for detecting a defect of an electrode assembly is provided, including a processor and a memory. The memory is configured to store a program. The processor is configured to call the program from the memory and run the program to perform the method for detecting a defect of an electrode assembly according to the first aspect or any possible implementation of the first aspect.

According to a third aspect, a computer-readable storage medium is provided, including a computer program. When executed on a computer, the computer program causes the computer to perform the method for detecting a defect of an electrode assembly according to the first aspect or any possible implementation of the first aspect.

BRIEF DESCRIPTION OF DRAWINGS

To describe the technical solutions of the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

FIG. 8 is a schematic flowchart of determining a width of an electrode assembly body in a first direction based on a corner point of the electrode assembly body according to an embodiment of this application;

DETAILED DESCRIPTION OF EMBODIMENTS

Figure 1:
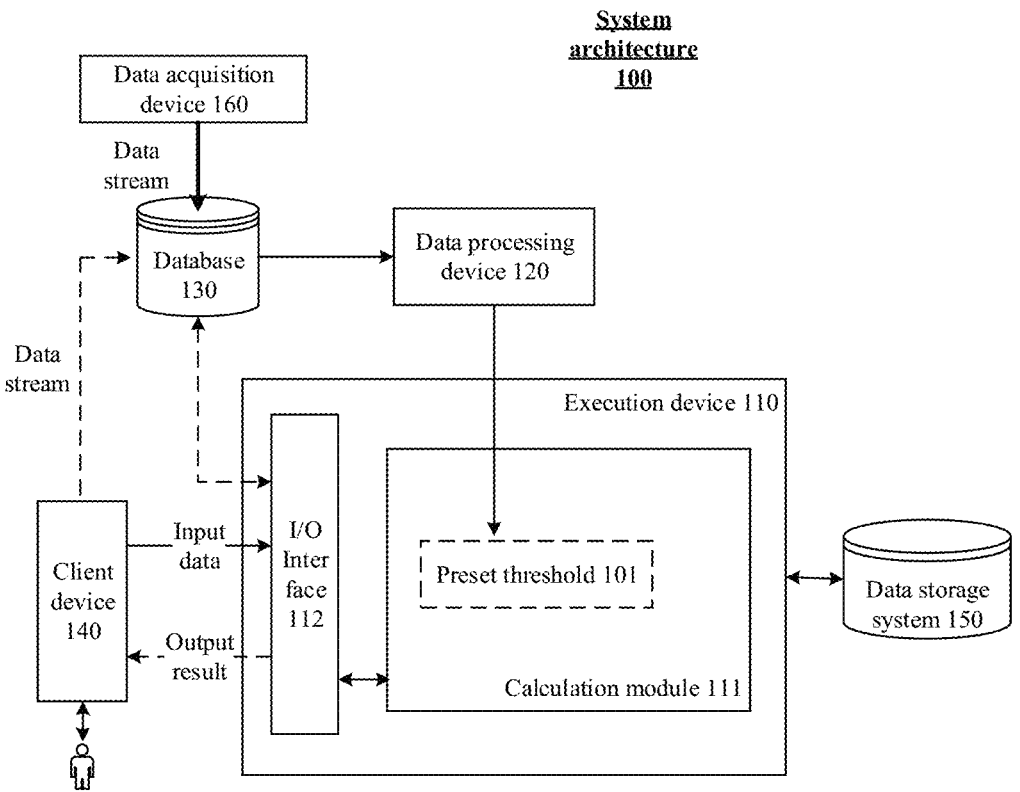
FIG. 1 is a schematic structural diagram of a system architecture according to this application.

The following gives a more detailed description of implementations of this application with reference to drawings and embodiments. The detailed description of the following embodiments and drawings are intended to describe the principles of this application illustratively, but not to limit the scope of this application. Therefore, this application is not limited to the described embodiments.

Some embodiments of this application are applicable to an image processing system, including but not limited to a product based on infrared imaging. A system for detecting a defect of an electrode assembly is applicable to various electronic devices containing a device for detecting a defect of an electrode assembly. The electronic devices may be a personal computer, computer workstation, smartphone, tablet computer, smart camera, media consumer device, wearable device, set-top box, game console, augmented reality (AR)/virtual reality (VR) device, in-vehicle terminal, or the like, without being limited in disclosed embodiments of this application.

Understandably, specific examples given herein are merely intended to help a person skilled in the art understand embodiments of this application more clearly, but not to limit the scope of embodiments of this application.

Understandably, in various embodiments of this application, the sequence number of a step does not mean the implementation order of the step. The implementation order of each step depends on its functionality and intrinsic logic, but does not constitute any limitation on the implementation process of an embodiment of this application.

Understandably, various embodiments described in this specification may be implemented alone or in combination, without being limited herein.

Unless otherwise defined, all technical and scientific terms used herein bear the same meanings as what is normally understood by a person skilled in the technical field of this application. The terms used herein are merely intended to describe specific embodiments but not to limit the scope of this application. The term "and/or" used herein includes any and all combinations of one or more relevant items recited.

Currently, the application of power batteries is increasingly extensive. Power batteries are not only applicable to elementary power systems such as hydro, wind, thermal, and solar power stations, but also widely used in electric means of transport such as electric bicycles, electric motorcycles, and electric vehicles, and in many other fields such as military equipment and aerospace. The market demand for power batteries keeps increasing with the increase of the fields to which the power batteries are applicable. A power battery typically includes a shell, a protection circuit, and an electrode assembly. In a production process of a battery, different defects may occur in a plurality of steps such as winding. The defect needs to be detected automatically by using vision technology.

The inventor hereof is aware that, in a process of manufacturing an electrode assembly, components of the electrode assembly usually need to be wound around a winding needle. The winding needle is removed (the needle is pulled out) after the components are wound into an electrode assembly, so as to detach the electrode assembly from the winding needle. In a practical production process, affected by factors such as machines and the environment, the electrode assembly is prone to defects such as protrusion and dislocation of a separator in the electrode assembly, thereby resulting in a decline in the yield rate of power batteries. Therefore, the defects such as protrusion and dislocation of the separator in the electrode assembly need to be detected effectively, so as to ensure safety of the manufactured power batteries.

However, the material of a tab of the electrode assembly is thin and soft. Therefore, the tab of the electrode assembly is prone to deform during manufacturing. The light reflectivity of the deformed region of the tab is low. Alternatively, when stacked tabs are dislocated, the light reflectivity of the dislocated region of the tabs is low. Therefore, the brightness of the deformed region and the dislocated region of the tab in the electrode assembly image is low, making it difficult to obtain complete image information of the electrode assembly, and difficult to determine the defect status of the electrode assembly based on the image information of the electrode assembly.

Based on the above considerations, in order to solve the problem that the defects of the electrode assembly are unable to be detected effectively due to unclarity of the image information of the electrode assembly caused by deformation of the tab or by dislocation of the stacked tabs, the inventor has designed through in-depth research a method for detecting a defect of an electrode assembly. According to this method, a first segmented image of the electrode assembly body in the electrode assembly image and a second segmented image of the tab in the electrode assembly image are determined based on different preset thresholds, and the defect status of the electrode assembly is determined based on the first segmented image and the second segmented image.

In the above method, the first preset threshold is greater than the second preset threshold. Therefore, the first segmented image determined based on the first preset threshold includes the image information of a relatively bright region (electrode assembly body) in the electrode assembly image, and the second segmented image determined based on the second preset threshold includes the image information of a relatively dark region (tab) in the electrode assembly image. The first segmented image and the second segmented image include the image information of different parts of the electrode assembly respectively. In this way, the defect status of the electrode assembly can be effectively detected based on the image information of the first segmented image and the second segmented image.

For a better understanding of the technical solutions of this application, the following first briefly describes, with reference to FIG. 1, possible scenarios in which an embodiment of this application is applicable.

As shown in FIG. 1, an embodiment of this application provides a system architecture 100. In FIG. 1, a data acquisition device 160 is configured to acquire a partially dark electrode assembly image. With respect to the method for detecting a defect of an electrode assembly according to an embodiment of this application, the partially dark electrode assembly image may be an electrode assembly image containing one or darker regions.

After acquiring a partially dark electrode assembly image, the data acquisition device 160 stores the partially dark electrode assembly image into a database 130. A data processing device 120 obtains a preset value 101 (including a first preset threshold and a second preset threshold) by processing the partially dark electrode assembly image maintained in the database 130.

The above preset threshold 101 is configured to determine segmented images (including a first segmented image and a second segmented image) in the method for detecting a defect of an electrode assembly according to an embodiment of this application. It is hereby noted that in practical applications, the partially dark electrode assembly images maintained in the database 130 are not necessarily all acquired by the data acquisition device 160, but may be received from another device. In addition, it is hereby noted that the data processing device 120 does not necessarily determine the preset threshold 101 solely based on the partially dark electrode assembly images maintained in the database 130. Instead, the partially dark electrode assembly images may be obtained from the cloud or elsewhere to as a basis for determining. The foregoing description is not intended as a limitation on any embodiment of this application.

The preset threshold 101 determined by the data processing device 120 may be applied to different systems or devices, for example, applied to an execution device 110 shown in FIG. 1. The execution device 110 may be a terminal such as a mobile phone terminal, a tablet computer, a notebook computer, and may be a server, a cloud, or the like. In FIG. 1, the execution device 110 is equipped with an input/output (input/output, I/O) interface 112 configured to perform data exchange with an external device. A user may input data to the I/O interface 112 through a client device 140. In this embodiment of this application, the input data may include the to-be-detected image (electrode assembly image) input by the client device 140.

In some implementations, the client device 140 may be the same device as the execution device 110 and the data processing device 120. For example, all the client device 140, the execution device 110, and the data processing device 120 may be a terminal device.

In some other implementations, the client device 140 may be a device different from the execution device 110. For example, the client device 140 is a terminal device, but the execution device 110 is a cloud, a server, or another device. The client device 140 may interact with the execution device 110 over a communications network based on any communications mechanism or communications standard. The communications network may be a wide area network, a local area network, a point-to-point connection, or the like, or any combination thereof.

A calculation module 111 of the execution device 110 is configured to perform operations based on the input data (such as the electrode assembly image) received by the I/O interface 112. When the calculation module 111 of the execution device 110 performs relevant operations such as calculation, the execution device 110 may call data, code, and the like from a data storage system 150 to perform corresponding operations, and may store the data, instructions, and the like obtained in the corresponding operations into the data storage system 150.

Finally, the I/O interface 112 returns a processing result, such as the obtained defect status of the electrode assembly, to the client device 140, so that the processing result is provided to the user.

In the situation shown in FIG. 1, the user may manually specify the input data, for example, by performing an operation on an interface provided by the I/O interface 112. In another circumstance, the client device 140 may automatically send the input data to the I/O interface 112. If the automatic sending of the input data by the client device 140 is subject to the user's permission, the user may set a corresponding permission in the client device 140. The user can view, on the client device 140, a result output by the execution device 110, and the result is rendered by means of display, sound, action, or the like. The client device 140 may serve as a data acquisition end, and acquires the input data of the input I/O interface 112 and the output result of the output I/O interface 112 as new specimen data, and stores the data in the database 130. Alternatively, instead of acquiring the data by the client device 140, the I/O interface 112 may directly use the input data of the input I/O interface 112 and the output result of the output I/O interface 112 shown in the drawing as new specimen data, and store the specimen data into the database 130.

It is hereby noted that FIG. 1 is merely a schematic diagram of a system architecture according to an embodiment of this application. The positional relationship between the devices, components, modules, and the like shown in the drawing does not constitute any limitation. For example, in FIG. 1, the data storage system 150 is an external memory to the execution device 110. In other circumstances, the data storage system 150 may be installed in the execution device 110.

Figure 2:
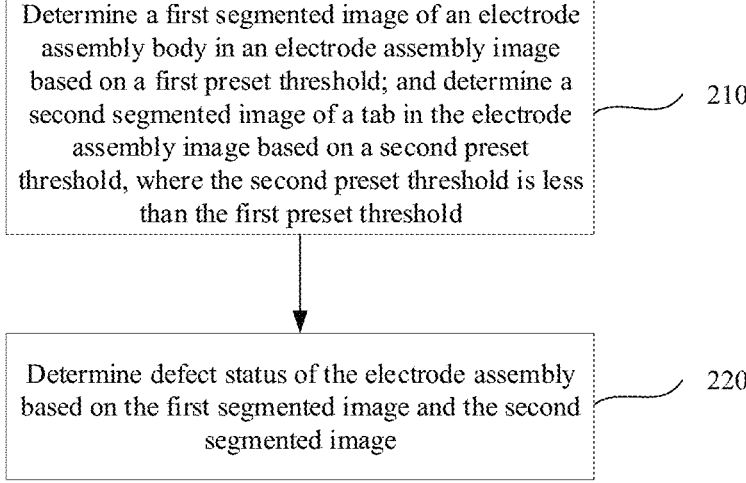
FIG. 2 is a schematic flowchart of a method for detecting a defect of an electrode assembly according to an embodiment of this application.

The following describes a main process of a method for detecting a defect of an electrode assembly according to an embodiment of this application with reference to FIG. 2.

FIG. 2 is a schematic flowchart of a method for detecting a defect of an electrode assembly according to an embodiment of this application.

210. Determine a first segmented image of an electrode assembly body in an electrode assembly image based on a first preset threshold; and determine a second segmented image of a tab in the electrode assembly image based on a second preset threshold. The second preset threshold is less than the first preset threshold.

Figure 3:
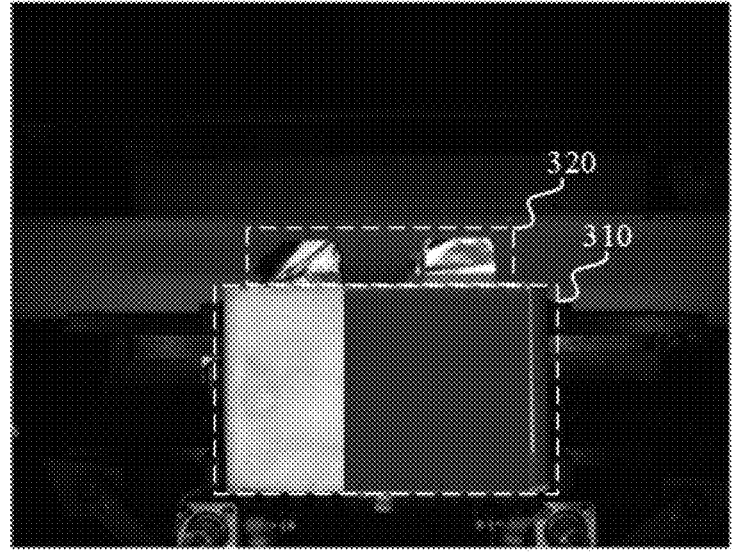
FIG. 3 is an electrode assembly image according to an embodiment of this application.

As shown in FIG. 3, the electrode assembly includes an electrode assembly body 310 and tabs 320. The electrode body 310 includes electrode plates (not shown in the drawing) and a separator (not shown in the drawing). The electrode assembly image may be an image shot by a charge coupled device (CCD) camera, or an image shot by another camera, without being limited herein.

In a practical production process, the electrode assembly may be photographed by a CCD camera after the winding needle is removed from the electrode assembly that is formed by winding. In this case, the electrode assembly body 310 and the tab 320 differ in the intensity of reflecting light, thereby resulting in bright and dark regions in the electrode assembly image. Therefore, a first segmented image of the electrode assembly body 310 in the electrode assembly image is determined based on a relatively high first preset threshold, and a second segmented image of the tab 320 in the electrode assembly image is determined based on a relatively low second preset threshold.

The first segmented image of the electrode assembly body 310 in the electrode assembly image may be determined based on the relatively high first preset threshold in various ways, and the second segmented image of the tab 320 in the electrode assembly image may be determined based on the relatively low second preset threshold by various methods such as direct thresholding, iterative thresholding, and triangle thresholding. The following describes an example based on direct thresholding.

The electrode assembly image may be segmented based on a thresholding method to obtain a first segmented image of the electrode assembly body 310 in the electrode assembly image. A threshold selected in the thresholding method is a first preset threshold. For example, if a pixel value at a position in the electrode assembly image is greater than or equal to the first preset threshold, the pixel value at this position is set to 1; or, if the pixel value at a position in the electrode assembly image is less than the first preset threshold, the pixel value at this position is set to 0, thereby obtaining a binary image. The binary image may be used as the first segmented image. The second segmented image is obtained in the same way.

It is hereby noted that, the light reflectivity at a deformed part of the tab 320 and at a dislocated part of the tab 320 is low, and therefore, the darkness of the corresponding region in the electrode assembly image is low, and the pixel value at the corresponding position is small. Therefore, the second preset threshold is set to be less than the first preset threshold to effectively sort out the image information of the above parts. Moreover, the light reflectivity at a non-deformed part of the tab 320 and at a non-dislocated part of the tab 320 is similar to the light reflectivity of the electrode assembly body 310. Therefore, the first segmented image includes the image information of the parts of relatively high reflectivity in the electrode assembly body 310 and the tab 320, and the second segmented image includes the image information of the parts of relatively low reflectivity in the tab 320.

220. Determine defect status of the electrode assembly based on the first segmented image and the second segmented image.

Specifically, the defect status of the electrode assembly is determined based on the image information of each part of the electrode assembly included in the first segmented image and the second segmented image. For example, the information on the tab 320 (for example, location information of the tab 320) in the first segmented image is determined based on the information on a local region (the region of relatively high reflectivity) in the tab 320 in the first segmented image, and based on the information on a local region (the region of relatively low reflectivity) in the tab 320 in the second segmented image. The height information of the electrode assembly is obtained. The defect status of the electrode assembly is determined depending on whether the height information of the electrode assembly satisfies a preset condition. The preset condition may be: the height at a position or region adjacent to the tab 320 exceeds a first reference height or not. If the height exceeds the first reference height, it is determined that the electrode assembly includes a defect (for example, a foreign object protruding from the electrode assembly body). Alternatively, the preset condition may be: the height of the tab exceeds a second reference height or not. If the height of the tab exceeds the second reference height, it is determined that the electrode assembly includes a defect (for example, the tab is defective). The first reference height is greater than the second reference height.

It is hereby noted that, in determining based on the first reference height whether the electrode assembly includes a defect, because the height of the tab 320 exceeds the first reference height, it is not necessary to consider the position of the tab 320 or the height information of the region. Therefore, the defect status can be determined simply based on the height information of the position or region adjacent to the tab 320. The specific criterion used to detect the defects of the electrode assembly may be set according to actual circumstances.

In an embodiment of this application, different thresholds are preset to obtain segmented images of different parts of the electrode assembly, thereby obtaining complete image information of the electrode assembly, and in turn, effectively detecting the defect status of the electrode assembly.

In some embodiments of this application, the determining defect status of the electrode assembly based on the first segmented image and the second segmented image includes: determining an overall image of the electrode assembly based on the first segmented image and the second segmented image, where the overall image includes the electrode assembly body and the tab; and determining the defect status of the electrode assembly based on the overall image.

Specifically, the overall image of the electrode assembly may be obtained by splicing the first segmented image and the second segmented image, or may be obtained by denoising the spliced image and extracting contours of the spliced image. The specific way of obtaining the overall image is not limited herein. In other words, the specific obtaining method is not limited so long as the overall image includes the image information of the electrode assembly body and the tab. The tab information of the overall image (for example, information on the corner point of the tab) is obtained, and the defect status of the electrode assembly is determined based on the tab information, for example, it is determined whether the tab includes a defect. Alternatively, the information on the electrode assembly body in the overall image is obtained, and, based on the information on the electrode assembly body in the overall image, it is determined whether the electrode assembly body includes a defect.

For example, the first segmented image and the second segmented image may be spliced to obtain a spliced electrode assembly image, and then the spliced electrode assembly image is denoised (for example, based on the opening operation algorithm) to obtain a spliced electrode assembly image that is relatively clean. A plurality of contours of this image are obtained (for example, by using a findContours function in OpenCv) to determine a communicating region. The communicating region includes a communicating region formed by the electrode assembly body and the tab, and a communicating region that is not thoroughly denoised. The communicating region formed by the electrode assembly body and the tab is larger than the noisy communicating region. Therefore, the image of the largest communicating region is used as the overall image. The information on the corner point of the tab may be determined by means of template matching. Based on the information on the corner points of the tab (for example, coordinates of (at least two) corner points of the tab), the position or region adjacent to the position of the tab is determined. It is determined whether the height of the position or region exceeds the first reference height. If the height of the position or region exceeds the first reference height, the electrode assembly includes a defect.

It is hereby noted that the defect status of the electrode assembly shown in the above embodiment is intended as just an example, but not intended as a limitation on this application.

In an embodiment of this application, the overall image includes the information on two parts: the electrode assembly body and the tab. Therefore, the defect status of the electrode assembly can be determined more effectively based on both the information on the electrode assembly body and the information on the tab in the overall image.

In some embodiments of this application, the determining the defect status of the electrode assembly based on the overall image includes: determining information on an inflection point of the tab based on the overall image, where the inflection point of the tab is an endpoint of a connecting line between the tab and the electrode assembly body; and determining the defect status of the electrode assembly based on the information on the inflection point of the tab.

For example, the information on the inflection point of the tab in the overall image may be determined by means of a template matching algorithm. Based on the information on the inflection point of the tab, the position or region adjacent to the position of the tab is determined. In addition, it is determined whether the height of the position or region exceeds the first reference height. If the height of the position or region exceeds the first reference height, the electrode assembly includes a defect.

In an embodiment of this application, the positional relationship between the inflection point of the tab and the electrode assembly body in the overall image is more stable and intuitive, and a location of the inflection point of the tab in the overall image is highly correlated with a location of a defect in the electrode assembly. Therefore, the defect of the electrode assembly can be determined effectively and accurately based on the information on the inflection point of the tab.

In some embodiments of this application, the determining information on an inflection point of the tab based on the overall image includes: determining a statistic chart of a pixel sum in a first direction based on the overall image, where the first direction is perpendicular to a direction of a first edge line of the electrode assembly body; and determining the information on the inflection point of the tab based on the statistic chart of the pixel sum in the first direction.

Specifically, pixel sums in the overall image are calculated column by column along a row direction of the overall image, so as to obtain a statistic chart of the pixel sums in the first direction. In the overall image, the pixel value is the same throughout the communicating region of the electrode assembly, and the pixel value is the same throughout the background region other than the communicating region of the electrode assembly. The difference of pixel sums is calculated between two adjacent columns. When the difference of pixel sums between two adjacent columns exceeds a first preset difference value, an inflection point exists on a column with a relatively small pixel sum among the two adjacent columns. Subsequently, based on the height of the electrode assembly body, the information on the inflection point of the tab (position information of the inflection point) is determined in the column with a relatively small pixel sum among the two adjacent columns.

In an embodiment of this application, the statistic chart of the pixel sum in the first direction in the overall image can intuitively and conveniently reflect height information of the electrode assembly, and an obvious height difference exists between two sides of the inflection point of the tab. Therefore, by determining the information on the inflection point of the tab based on the statistic chart of the pixel sum in the first direction, it is simple and effective to obtain the information on the inflection point of the tab.

In some embodiments of this application, the determining the information on the inflection point of the tab based on the statistic chart of the pixel sum in the first direction includes: determining the information on the inflection point of the tab based on a first statistic chart of the pixel sum of a first target region in the first direction in the overall image. The first target region is a region between the first edge line of the electrode assembly body in the overall image and a first boundary line of the overall image. The first edge line is an edge line of the electrode assembly body at an end close to the tab, and the first boundary line is a boundary line of the overall image at an end close to the tab.

Specifically, the method for determining the first statistic chart of the pixel sum of the first target region R1 in the first direction is similar to the method for determining the statistic chart of the pixel sum of the overall image in the first direction, and is not described in detail here again. The first edge line in the overall image may be recognized in various ways. For example, the first edge line may be determined by using a line segment detector algorithm, or determined based on the corner points of the electrode assembly body.

Figure 4:
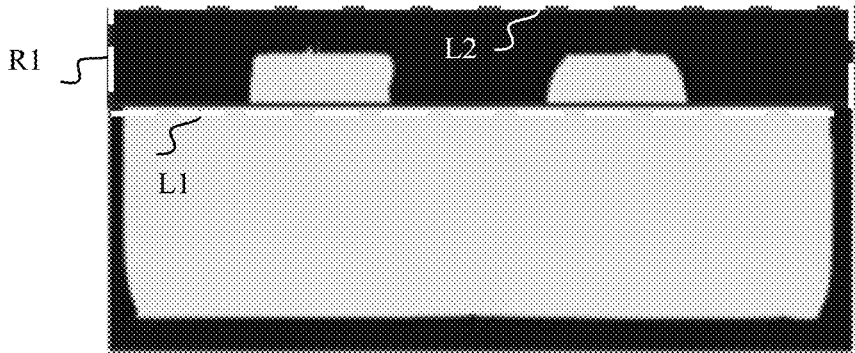
FIG. 4 is an overall image according to an embodiment of this application.

For example, as shown in FIG. 4, the first edge line L1 of the electrode assembly body in the overall image may be obtained based on the line segment detector algorithm. The first target region R1 in the overall image is determined based on the first edge line L1 of the electrode assembly body and the first boundary line L2 of the overall image.

Figure 5:
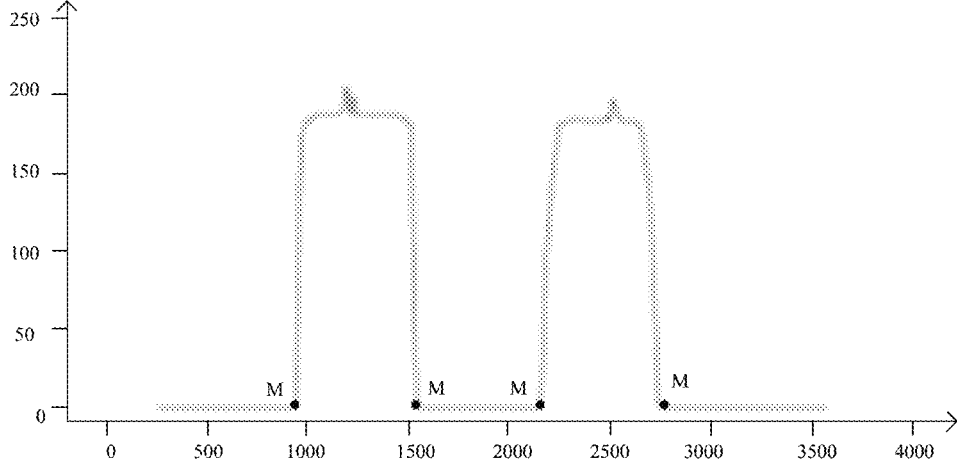
FIG. 5 is a first statistic chart of a pixel sum of a first target region in a first direction in an overall image according to an embodiment of this application.

FIG. 5 is a first statistic chart of a pixel sum of a first target region R1 in a first direction according to an embodiment of this application. In the drawing, the value of each gentle line in the first statistic chart corresponds to a pixel sum of a region (totally being a background) not connected to the tab in the first edge line L1 in the first target region R1, and the value at each bump may correspond to a pixel sum of the tab region (including the tab and the background) in the first target region R1. The junction M1, junction M2, junction M3, and junction M4 between the gentle lines and the bumps correspond to the inflection points of the tab. Each of the bumps may be a part with a pixel sum greater than zero and with a specified width (for example, the difference in abscissa falls within a range of 400 to 800). For example, in FIG. 5, in the first statistic image, the segment M1-M2 is a bump, and the segment M3-M4 is another bump.

The inflection points in the first statistic chart may be determined in various ways. For example, the information on the inflection points of the tab may be determined based on the difference of pixel sums between two adjacent columns in the first statistic chart, or the information on the inflection points of the tab may be determined based on the change of pixel sums in the first statistic chart.

For example, a preset pixel sum range (for example, 0 to 100) is determined based on the height information of the tab. A search range (not shown in the drawing) of the inflection points of the tab is determined in the first statistic chart based on the preset pixel sum range. Subsequently, the information on the inflection points of the tab is determined within the search range of the inflection points of the tab based on preset distance information ($d_x$, $d_y$).

In an embodiment of this application, the first target region includes the height information of the tab and the first edge line, but does not cover the width information of the electrode assembly body. Therefore, the first statistic chart can more intuitively reflect the height of the tab, so as to facilitate more effective determining of the information on the inflection point of the tab.

In some embodiments of this application, the determining the information on the inflection point of the tab based on a first statistic chart of the pixel sum of a first target region in the first direction in the overall image includes: determining the information on the inflection point of the tab based on a bump in the first statistic chart.

Specifically, the distance between different bumps may be calculated based on the positions of the bumps in the first statistic chart. Some defects usually exist in the electrode assembly manufactured on a practical production line. Therefore, a plurality of bumps may exist in the first statistic chart, and it is necessary to screen the plurality of bumps to determine the bump corresponding to an inflection point. Therefore, the bump corresponding to a maximum value of the distances between different bumps is used as an inflection point of the tab.

Figure 7:
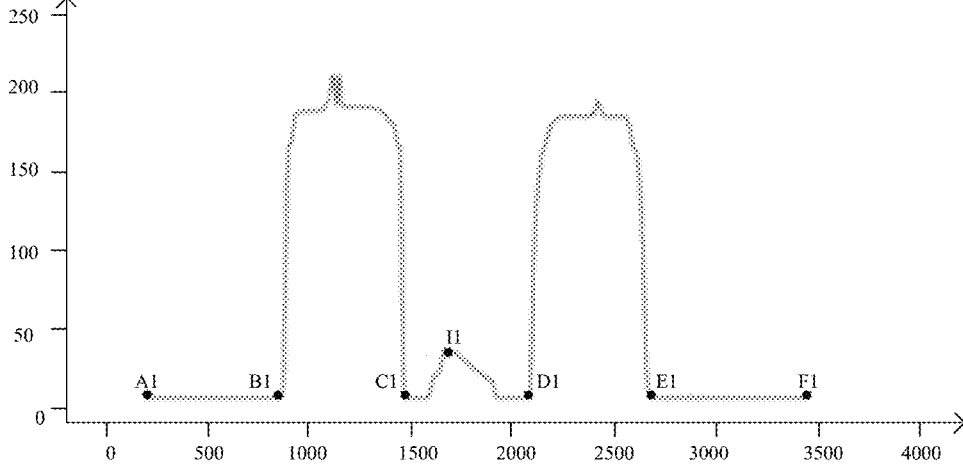
FIG. 7 is a first statistic chart of a pixel sum of a first target region in a first direction in an overall image according to another embodiment of this application.

For example, as shown in FIG. 7, three bumps exist in the first statistic chart. That is, the bump between B1 and C1, the bump between I2 and I3, and the bump between D1 and E1. In this case, the distance between the three bumps needs to be calculated. For example, the distances between the start points of the three bumps (for example, the distance between B1 and I2, the distance between I2 and D1, and the distance between B1 and D1) may be calculated. The bump corresponding to the maximum distance (the distance between B1 and D1) is used as an inflection point of the tab.

In an embodiment of this application, the bump in the first statistic chart can intuitively reflect the information on the inflection point of the tab. Therefore, by determining the information on the inflection point of the tab based on the bump in the first statistic chart, it is more intuitive and convenient to obtain the information on the inflection point of the tab.

In some embodiments of this application, the inflection point of the tab includes a first inflection point and a second inflection point of a first tab along the first edge line, and a first inflection point and a second inflection point of a second tab. The determining the defect status of the electrode assembly based on the information on the inflection point of the tab includes: determining, based on values corresponding to a first segment, a second segment, and a third segment of the first edge line in the first statistic chart, whether the electrode assembly includes a separator protrusion defect. The first segment is a segment between a first corner point of the electrode assembly body and the first inflection point of the first tab. The second segment is a segment between the second inflection point of the first tab and the first inflection point of the second tab. The third segment is a segment between the second inflection point of the second tab and a second corner point of the electrode assembly body. The first corner point is a corner point close to the first tab on the first edge line of the electrode assembly body, and the second corner point is a corner point close to the second tab on the first edge line of the electrode assembly body.

Figure 6:
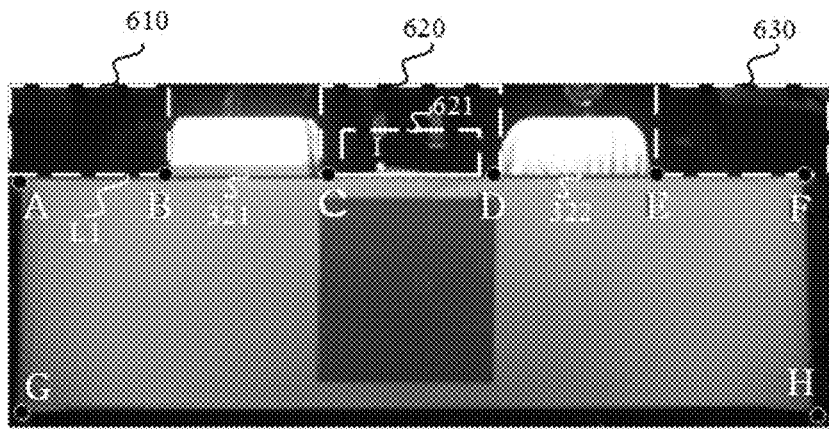
FIG. 6 is an electrode assembly image according to another embodiment of this application.

As an example, as shown in FIG. 6, the first inflection point B of the first tab 321, the second inflection point C of the first tab 321, the first inflection point D of the second tab 322, and the second inflection point E of the second tab 322 in the electrode assembly image may be determined according to the method for determining the information on the inflection point of the tab described in the above embodiment. The first corner point A and the second corner point F on the first edge line L1 of the electrode assembly body in the electrode assembly image may be determined by using a template matching algorithm.

As shown in FIG. 7, the values of the first segment A1-B1 in the first statistic chart, the second segment C1-D1 in the first statistic chart, and the third segment E1-F1 in the first statistic chart correspond to the pixel distributions of the first region 610, the second region 620, and the third region 630, respectively, in FIG. 6. The first region 610, the second region 620, and the third region 630 are regions prone to defects in the electrode assembly. Therefore, based on the relationship between the maximum pixel sum in the first statistic chart and the values of the first segment A1-B1, the second segment C1-D1, and the third segment E1-F1 separately, it may be determined whether the electrode assembly includes a separator protrusion defect. If one of the values of the first segment A1-B1, the second segment C1-D1, and the third segment E1-F1 is less than or equal to a second preset difference value, it is determined that the electrode assembly includes a separator protrusion defect. If all the values of the first segment A1-B1, the second segment C1-D1, and the third segment E1-F1 are greater than the second preset difference value, it is determined that the electrode assembly includes no separator protrusion defect.

In an embodiment of this application, the values corresponding to the first segment, the second segment, and the third segment of the first edge line intuitively reflect the pixels in a place prone to separator protrusion in the electrode assembly. Therefore, based on the values corresponding to the first segment, the second segment, and the third segment of the first edge line, it is intuitive and convenient to determine whether the electrode assembly includes a separator protrusion defect, and to determine the location of the separator protrusion defect in the electrode assembly.

In some embodiments of this application, the determining, based on values corresponding to a first segment, a second segment, and a third segment of the first edge line in the first statistic chart, whether the electrode assembly includes a separator protrusion defect, includes: determining, in a case that one of values corresponding to the first segment, the second segment, and the third segment respectively is greater than or equal to a preset threshold, that the electrode assembly includes the separator protrusion defect; or, determining, in a case that all values corresponding to the first segment, the second segment, and the third segment are less than a preset threshold, that the electrode assembly includes no separator protrusion defect.

The following describes an example in which the separator protrusion defect occurs in the second region 620. As shown in FIG. 6 and FIG. 7, a separator (a separator protrusion region 621) occurs in the second region 620. Therefore, the value corresponding to the second segment C1-D1 of the first edge line in the first statistic chart is larger. In other words, when no separator occurs in the second region 620 (totally being a background), the pixel sum of the second region 620 in the first direction is zero. When the separator occurs in the second region 620 (including the background and the separator), the pixel sum of the second region 620 in the first direction increases with the increase of the area of the separator. Moreover, the value corresponding to the second segment C1-D1 of the first edge line in the first statistic chart also reflects the height of the separator protrusion. In FIG. 6, the highest point I formed by pulling out the winding needle represents the maximum height of the separator protrusion. Therefore, the value of the corresponding point I1 in FIG. 7 is the maximum value in the second segment C1-D1. In this way, when the value corresponding to the second segment C1-D1 of the first edge line in the first statistic chart is larger, the height of the separator protrusion is greater. When the value corresponding to the second segment C1-D1 is greater than or equal to the preset threshold, it is determined that the electrode assembly includes a separator protrusion defect at this position. When the value corresponding to the second segment C1-D1 is less than the preset threshold, it is determined that the electrode assembly includes no separator protrusion defect at this position.

It is hereby noted that, the method for determining the separator defect status of the electrode assembly based on whether the values corresponding to the first segment and the third segment respectively are greater than or equal to the preset threshold is similar to the method applied in the case of the second segment, and is not described in detail here again.

In an embodiment of this application, the values corresponding to the first segment, the second segment, and the third segment can directly reflect a distance between the separator and the first edge line of the electrode assembly body. Therefore, based on the relationship between the preset threshold and the values corresponding to the first segment and the third segment, it is practicable to determine whether the electrode assembly includes a separator protrusion defect, and it is convenient to directly obtain the information on the protrusion height of the separator.

It is hereby noted that, in some application scenarios, the separator protrusion part of the electrode assembly occurs not only on the electrode assembly body at a side close to the tab, but also on the electrode assembly body at a side away from the tab. To further solve the problem, this application further discloses the following embodiment.

In some embodiments of this application, the determining the defect status of the electrode assembly based on the overall image includes: determining the defect status of the electrode assembly based on a second statistic chart of a pixel sum of a second target region in a second direction in the overall image. The second direction is perpendicular to a direction of a second edge line of the electrode assembly body. The second target region is a region between the second edge line of the electrode assembly body in the overall image and a second boundary line of the overall image. The second edge line is an edge line of the electrode assembly body at an end away from the tab. The second boundary line is a boundary line of the overall image at an end away from the tab.

Specifically, the method for obtaining the second statistic chart of the pixel sum of the second target region in the second direction in the overall image is similar to the method for obtaining the first statistic chart of the pixel sum of the first target region in the first direction in the overall image, and is not described in detail here again. The separator protrusion defect may be determined based on a tendency of the second statistic chart. For example, when the second statistic chart is a straight line, it is determined that the electrode assembly includes no separator protrusion defect. When the second statistic chart is not a straight line, it is determined that the electrode assembly includes a separator defect.

It is hereby noted that the first direction may be parallel to the second direction.

In an embodiment of this application, the second statistic chart of the pixel sum of the second target region in the second direction in the overall image reflects the protrusion of the separator of the electrode assembly body on the side away from the tab. Therefore, the defect status of the electrode assembly is determined based on the second statistic chart of the pixel sum of the second target region in the second direction in the overall image, so that the separator protrusion defect of the electrode assembly can be detected more comprehensively.

In some embodiments of this application, the determining the defect status of the electrode assembly based on a second statistic chart of a pixel sum of a second target region in a second direction in the overall image includes: determining, based on a value corresponding to the second edge line in the second statistic chart, whether the electrode assembly includes a separator protrusion defect.

Specifically, the value corresponding to the second edge line in the second statistic chart reflects the separator protrusion status of the electrode assembly at a side away from the tab. The larger the value corresponding to the second edge line, the more the separator protrudes from the electrode assembly at the side away from the tab. In addition, the position of the separator protrusion on the electrode assembly at the side away from the tab may be determined based on the coordinates of the value corresponding to the first edge line.

In an embodiment of this application, the value corresponding to the second edge line is proportional to the protrusion height of the separator of the electrode assembly, and the coordinates of the value corresponding to the second edge line correspond to the coordinates of the location of the separator protrusion of the electrode assembly. Therefore, based on the value corresponding to the second edge line in the second statistic chart, it can be determined whether the electrode assembly includes a separator protrusion defect, and in addition, the location of the separator protrusion can be determined.

In some embodiments of this application, the determining, based on a value corresponding to the second edge line in the second statistic chart, whether the electrode assembly includes a separator protrusion defect includes: determining, in a case that the value corresponding to the second edge line is greater than or equal to a preset threshold, that the electrode assembly includes the separator protrusion defect; or, determining, in a case that the value corresponding to the second edge line is less than a preset threshold, that the electrode assembly includes no separator protrusion defect.

Understandably, when no separator protrusion occurs in the second target region, the second target region includes the background alone, and therefore, the values of the second statistic chart are all zero. When a separator protrusion occurs in the second target region, the second target region includes both the background and the separator, and therefore, non-zero values exist in the second statistic chart. In this case, based on the relationships between each of the non-zero values and a preset threshold, it is determined whether each of the separator parts in the second target region protrudes from the electrode assembly. When a non-zero value in the second statistic chart is greater than or equal to the preset threshold, it is determined that the electrode assembly includes a separator protrusion. When the non-zero values in the second statistic chart are less than the preset threshold, it is determined that the electrode assembly includes no separator protrusion defect.

In an embodiment of this application, the status of the separator of the electrode assembly is determined by checking whether the value corresponding to the second edge line is greater than or equal to a preset threshold, thereby not only determining whether a separator defect exists in the electrode assembly, but also determining the protrusion height of the separator of the electrode assembly.

In some possible implementations, the method for detecting a defect of an electrode assembly further includes: determining a width of the electrode assembly body in a first direction in the electrode assembly image, where the first direction is perpendicular to a direction of a first edge line of the electrode assembly body; and determining, based on the width, whether the electrode assembly includes a separator dislocation defect.

Specifically, the width of the electrode assembly body in the first direction may be determined based on a distance from a point (such as an inflection point of the tab) on the first edge line of the electrode assembly body in the electrode assembly image to the second edge line of the electrode assembly body. In addition, based on the relationship between the width of the electrode assembly body in the first direction and a preset range, it is determined whether the electrode assembly includes a separator dislocation defect.

In an embodiment of this application, the separator dislocation defect is determined based on the width of the electrode assembly body in the first direction in the electrode assembly image, it is convenient to determine whether a separator dislocation defect occurs in the electrode assembly, so as to determine more types of defects of the electrode assembly.

In some possible implementations, the determining, based on the width, whether the electrode assembly includes a separator dislocation defect includes: determining, in a case that the width exceeds a preset range, that the electrode assembly includes the separator dislocation defect; or, determining, in a case that the width does not exceed a preset range, that the electrode assembly includes no separator dislocation defect.

Understandably, when the separator is dislocated, the width of the electrode assembly body in the first direction increases. When the width exceeds the preset range, it is determined that the electrode assembly includes a separator dislocation defect. When the width does not exceed the preset range, it is determined that the electrode assembly includes no separator dislocation defect.

In an embodiment of this application, the separator dislocation status is determined depending on whether the width exceeds the preset range, thereby not only determining whether a separator dislocation occurs in the electrode assembly, but also determining the width of the separator dislocation in the electrode assembly.

In some possible implementations, the determining a width of the electrode assembly body in a first direction in the electrode assembly image includes: determining a corner point of the electrode assembly body; and determining the width based on the corner point of the electrode assembly body.

The corner point of the electrode assembly and the corner point of the electrode assembly body may be determined in various ways, so as to determine the height. For example, as shown in FIG. 8, the width of the electrode assembly body in the first direction may be determined based on the corner point of the electrode assembly body.

910. Obtain template images.

Figure 9:
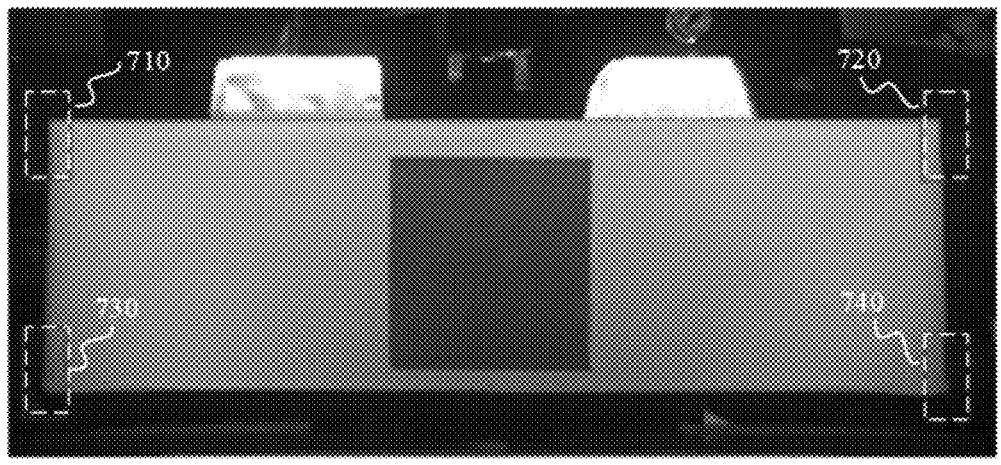
FIG. 9 is a template image according to an embodiment of this application.

As shown in FIG. 9, a rectangular region 710 containing the first corner point of the electrode assembly body in the template image, a rectangular region 720 containing the second corner point of the electrode assembly body, a rectangular region 730 containing the third corner point of the electrode assembly body, and a rectangular region 740 containing the fourth corner point of the electrode assembly body may be used as four different template images respectively.

920. Determine the first corner point of the electrode assembly body, the second corner point of the electrode assembly body, the third corner point of the electrode assembly body, and the fourth corner point of the electrode assembly body in the electrode assembly image based on a template matching algorithm.

Search the electrode assembly image based on the 4 different template images. Determine 4 target corner regions most similar to the template images in the electrode assembly image. Determine the corresponding corner points of the electrode assembly body (as shown in FIG. 6, the first corner point A, the second corner point F, the third corner point G, and the fourth corner point H) in the corresponding target corner regions based on preset position information ($d_{x1}$, $d_{y1}$).

930. Determine a first edge line of the electrode assembly body based on the coordinates of the first corner point or the second corner point, and determine a second edge line of the electrode assembly body based on the coordinates of the third corner point or the fourth corner point.

940. Determine a width of the electrode assembly body in the first direction based on a distance from the first corner point or the second corner point to the second edge line, or based on a distance from the third corner point or the fourth corner point to the first edge line.

In an embodiment of this application, the position of the corner point of the electrode assembly body is relatively stable. Therefore, the width can be obtained accurately based on the corner point, thereby determining the separator dislocation status of the electrode assembly more accurately.

Figure 10:
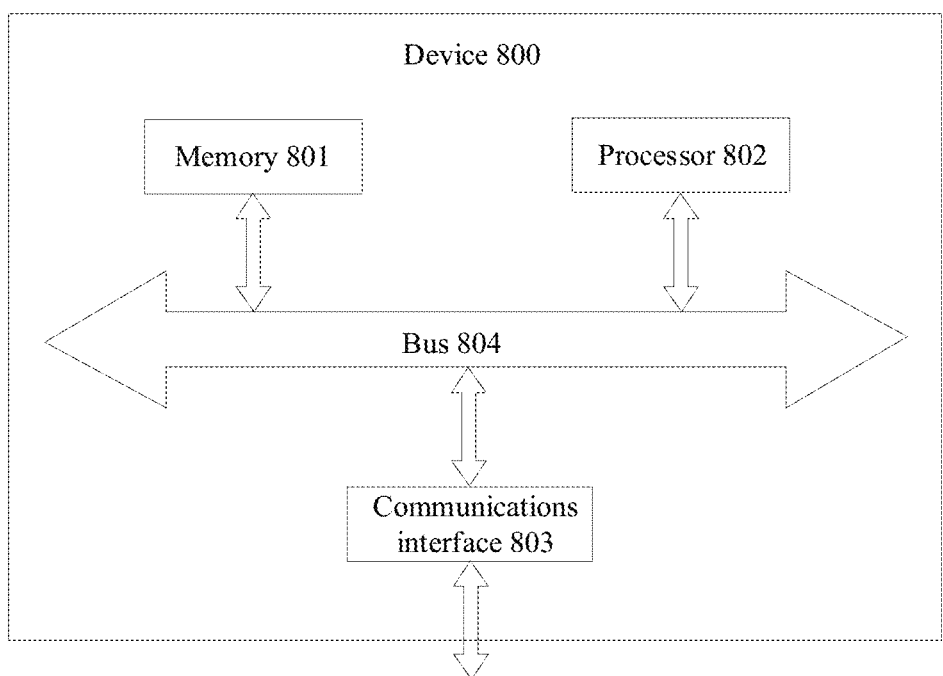
FIG. 10 is a schematic structural hardware diagram of a device for detecting a defect of an electrode assembly according to an embodiment of this application.

FIG. 10 is a schematic structural hardware diagram of a device for detecting a defect of an electrode assembly according to an embodiment of this application. The device 800 for detecting a defect of an electrode assembly shown in FIG. 10 includes a memory 801, a processor 802, a communications interface 803, and a bus 804. The memory 801, the processor 802, and the communications interface 803 are connected to each other by the bus 804 to implement communications connection between each other.

The memory 801 may be a read-only memory (ROM), a static storage device, or a random access memory (RAM). The memory 801 may store a program. When the program stored in the memory 801 is executed by the processor 802, the processor 802 and the communications interface 803 are configured to perform steps of the method for detecting a defect of an electrode assembly according to an embodiment of this application.

The processor 802 may be a general-purpose central processing unit (CPU), a microprocessor, an application specific integrated circuit (ASIC), a graphics processing unit (GPU), or one or more integrated circuits. The processor is configured to perform relevant programs to perform the method for detecting a defect of an electrode assembly according to an embodiment of this application.

Alternatively, the processor 802 may be an integrated circuit chip capable of processing signals. In an implementation process, the steps of the method for detecting a defect of an electrode assembly according to an embodiment of this application may be performed by an integrated logic circuit in the hardware form or an instruction in the software form in the processor 802.

The processor 802 may be a general-purpose processor, a digital signal processor (DSP), an ASIC, a field programmable gate array (FPGA), or another programmable logic device, a discrete gate, or a transistor logic device, or a discrete hardware component. The processor can implement or perform the methods, steps, and logic block diagrams disclosed in an embodiment of this application. The general-purpose processor may be a microprocessor, or the processor may be any conventional processor or the like. The steps of the method disclosed in an embodiment of this application may be directly performed by a hardware processor, or performed by a combination of hardware and software modules in the processor. A software module may be located in a mature storage medium in the art, such as a random access memory, a flash memory, a read-only memory, a programmable read-only memory, an electrically erasable programmable memory, a register, or the like. The storage medium is located in the memory 801. The processor 802 reads the information in the memory 801, and works together with hardware to perform the method for detecting a defect of an electrode assembly according to an embodiment of this application.

The communications interface 803 may use, but without limitation, a transmitting and receiving device such as a transceiver to implement communication between the device 800 and another device or a communications network. For example, traffic data of an unknown device may be obtained through the communications interface 803.

The bus 804 may include a path configured to transfer information between components (for example, memory 801, processor 802, and communications interface 803) of the device 800.

It is hereby noted that although the device 800 shown in the drawing includes just a memory, a processor, and a communications interface, a person skilled in the art understands that the device 800 in specific implementations may include other components required for normal operation. In addition, a person skilled in the art understands that the device 800 may further include a hardware component configured to implement another additional function as specifically required. Moreover, a person skilled in the art understands that the device 800 may include just the components necessary to implement an embodiment of this application, but without including all components shown in FIG. 10.

An embodiment of this application further provides a computer-readable storage medium configured to store program code executable by a device. The program code includes an instruction used for performing the steps in the method for detecting a defect of an electrode assembly.

An embodiment of this application further provides a computer program product. The computer program product includes a computer program stored on a computer-readable storage medium. The computer program includes a program instruction. When executed on a computer, the program instruction causes the computer to perform the method for detecting a defect of an electrode assembly.

The computer-readable storage medium may be a transitory computer-readable medium or a non-transitory computer-readable storage medium.

A person skilled in the art is clearly aware that for convenience and brevity of description, detailed working processes of the device, the computer-readable storage medium, and the computer program product described above may be learned by referring to the corresponding process in the foregoing method embodiment, details of which are omitted here.

In the several embodiments provided in this application, it is understandable that the disclosed device and method may be implemented in other manners. For example, the described device embodiment is merely illustrative. For example, the division of the device into several units is merely a type of logic function division, and the device may be divided in other manners in practical implementations. For example, a plurality of units or components may be combined or integrated into another system, or some features may be ignored or skipped. In addition, a mutual coupling or direct coupling or communications connection illustrated or discussed herein may be an indirect coupling or communications connection implemented through some interfaces, devices, or units, and may be in electrical, mechanical or other forms.

The terms used herein are merely used to describe an embodiment but not to limit the claims. Unless otherwise expressly specified in the context, a noun in the singular form preceded by "a", "an", or "the" used in the description of an embodiment or claims is intended to include the plural form of the noun. Similarly, the term "and/or" used herein means any and all possible combinations of one or more relevant items recited. In addition, when used in this application, the terms "include" and "comprise" mean the presence of stated features, entirety, steps, operations, elements, and/or components, but without excluding the presence or addition of one or more other features, entirety, steps, operations, elements, components, and/or any combination thereof.

The aspects, implementation manners, implementations, or features in a described embodiment can be used alone or in any combination. Each aspect of an embodiment described herein may be implemented by software, hardware, or a combination of hardware and software. The described embodiment may be embodied by a computer-readable medium that stores computer-readable code. The computer-readable code includes an instruction executable by at least one computing device. The computer-readable medium may be correlated with any data storage device capable of storing data that is readable by a computer system. Examples of the computer-readable media may include a read-only memory, a random-access memory, a compact disc read-only memory (CD-ROM), a hard disk drive (HDD), a digital video disc (DVD), magnetic tape, an optical data storage device, and the like. The computer-readable medium may be distributed in a computer system connected over a network so that the computer-readable code can be stored and executed in a distributed manner.

The foregoing technical description may be read by reference to the drawings appended hereto. The drawings form a part hereof and have illustrated the implementations in accordance with the described embodiments. Although the embodiments are described in sufficient detail to enable a person skilled in the art to implement the embodiments, the embodiments are non-restrictive so that other embodiments can be used, and changes may be made to the embodiments without departing from the scope of the described embodiments. For example, the order of operations illustrated in a flowchart is non-restrictive, and therefore, the order of two or more operations illustrated in the flowchart and described with reference to the flowchart may be changed according to several embodiments. As another example, in several embodiments, one or more operations illustrated in the flowchart and described with reference to the flowchart are optional or deletable. In addition, some steps or functions may be added to and embodiment disclosed herein, or the order between two or more steps may be permuted. All such variations are considered to be included in the disclosed embodiments and claims.

Moreover, terms are used in the foregoing technical description to enable a thorough understanding of the described embodiments. However, undue detail is not required to implement the described embodiments. Therefore, the foregoing description of embodiments is rendered for purposes of interpretation and description. The embodiments rendered in the foregoing description and the examples disclosed according to such embodiments are provided separately to add a context for ease of understanding of the described embodiments. The specification described above is not intended to be exhaustive or to limit the described embodiments to a precise form of this application. Several modifications, alternatives, and variations may be made based on the foregoing teachings. In some circumstances, well-known process steps have not been described in detail in order not to unnecessarily obscure the described embodiments. Although this application has been described with reference to illustrative embodiments, various improvements may be made to the embodiments without departing from the scope of this application, and the components in this application may be replaced with equivalents. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A computer-implemented method for detecting a defect of an electrode assembly, characterized in that the method comprises:

determining a first segmented image of an electrode assembly body in an electrode assembly image based on a first preset threshold;

determining a second segmented image of a tab in the electrode assembly image based on a second preset threshold, wherein the second preset threshold is less than the first preset threshold; and determining defect status of the electrode assembly based on the first segmented image and the second segmented image;

wherein the determining defect status of the electrode assembly based on the first segmented image and the second segmented image comprises:

determining an overall image of the electrode assembly based on the first segmented image and the second segmented image, wherein the overall image comprises the electrode assembly body and the tab; and determining the defect status of the electrode assembly based on the overall image; and wherein the determining the defect status of the electrode assembly based on the overall image comprises:

determining information on an inflection point of the tab based on the overall image, wherein the inflection point of the tab is an endpoint of a connecting line between the tab and the electrode assembly body; and determining the defect status of the electrode assembly based on the information on the inflection point of the tab.

2. The method according to claim 1, characterized in that the determining information on an inflection point of the tab based on the overall image comprises:

determining a statistic chart of a pixel sum in a first direction based on the overall image, wherein the first direction is perpendicular to a direction of a first edge line of the electrode assembly body, and the first edge line of the electrode assembly body is an edge line of the electrode assembly body at an end close to the tab in the overall image; and determining the information on the inflection point of the tab based on the statistic chart of the pixel sum in the first direction.

3. The method according to claim 2, characterized in that the determining the information on the inflection point of the tab based on the statistic chart of the pixel sum in the first direction comprises:

determining the information on the inflection point of the tab based on a first statistic chart of the pixel sum of a first target region in the first direction, wherein the first target region is a region between the first edge line of the electrode assembly body in the overall image and a first boundary line of the overall image, and the first boundary line of the overall image is a boundary line of the overall image at an end close to the tab.

4. The method according to claim 3, characterized in that the determining the information on the inflection point of the tab based on a first statistic chart of the pixel sum of a first target region in the first direction comprises:

determining the information on the inflection point of the tab based on a bump in the first statistic chart.

5. The method according to claim 3, characterized in that the inflection point of the tab comprises a first inflection point and a second inflection point of a first tab along the first edge line, and a first inflection point and a second inflection point of a second tab; and the determining the defect status of the electrode assembly based on the information on the inflection point of the tab comprises:

determining, based on values corresponding to a first segment, a second segment, and a third segment of the first edge line in the first statistic chart, whether the electrode assembly comprises a separator protrusion defect, wherein the first segment is a segment between a first corner point of the electrode assembly body and the first inflection point of the first tab, the second segment is a segment between the second inflection point of the first tab and the first inflection point of the second tab, the third segment is a segment between the second inflection point of the second tab and a second corner point of the electrode assembly body, the first corner point is a corner point close to the first tab on the first edge line of the electrode assembly body, and the second corner point is a corner point close to the second tab on the first edge line of the electrode assembly body.

6. The method according to claim 5, characterized in that the determining, based on values corresponding to a first segment, a second segment, and a third segment of the first edge line in the first statistic chart, whether the electrode assembly comprises a separator protrusion defect, comprises:

determining, in a case that one of values corresponding to the first segment, the second segment, and the third segment respectively is greater than or equal to a preset threshold, that the electrode assembly comprises the separator protrusion defect; or determining, in a case that values corresponding to the first segment, the second segment, and the third segment are all less than a preset threshold, that the electrode assembly comprises no separator protrusion defect.

7. The method according to claim 1, characterized in that the determining the defect status of the electrode assembly based on the overall image comprises:

determining the defect status of the electrode assembly based on a second statistic chart of a pixel sum of a second target region in a second direction, wherein the second direction is perpendicular to a direction of a second edge line of the electrode assembly body, the second target region is a region between the second edge line of the electrode assembly body in the overall image and a second boundary line of the overall image, the second edge line of the electrode assembly body is an edge line of the electrode assembly body at an end away from the tab, and the second boundary line of the overall image is a boundary line of the overall image at an end away from the tab.

8. The method according to claim 7, characterized in that the determining the defect status of the electrode assembly based on a second statistic chart of a pixel sum of a second target region in a second direction comprises:

determining, based on a value corresponding to the second edge line in the second statistic chart, whether the electrode assembly comprises a separator protrusion defect.

9. The method according to claim 8, characterized in that the determining, based on a value corresponding to the second edge line in the second statistic chart, whether the electrode assembly comprises a separator protrusion defect comprises:

determining, in a case that the value corresponding to the second edge line is greater than or equal to a preset threshold, that the electrode assembly comprises the separator protrusion defect; or determining, in a case that the value corresponding to the second edge line is less than a preset threshold, that the electrode assembly comprises no separator protrusion defect.

10. The method according to claim 1, characterized in that the method further comprises:

determining a width of the electrode assembly body in a first direction in the electrode assembly image, wherein the first direction is perpendicular to a direction of a first edge line of the electrode assembly body, and the first edge line of the electrode assembly body is an edge line of the electrode assembly body at an end close to the tab in the overall image; and determining, based on the width, whether the electrode assembly comprises a separator dislocation defect.

11. The method according to claim 10, characterized in that the determining, based on the width, whether the electrode assembly comprises a separator dislocation defect comprises:

determining, in a case that the width exceeds a preset range, that the electrode assembly comprises the separator dislocation defect; or determining, in a case that the width does not exceed a preset range, that the electrode assembly comprises no separator dislocation defect.

12. The method according to claim 10, characterized in that the determining a width of the electrode assembly body in a first direction in the electrode assembly image comprises:

determining a corner point of the electrode assembly body; and determining the width based on the corner point of the electrode assembly body.

13. A device for detecting a defect of an electrode assembly, characterized in that the device comprises a processor and a memory, the memory is configured to store a program, and the processor is configured to call the program from the memory and run the program to perform the method for detecting a defect of an electrode assembly according to claim 1.

14. A non-transitory computer-readable storage medium, characterized in that the storage medium comprises a computer program, and, when executed on a computer, the computer program causes the computer to perform the method for detecting a defect of an electrode assembly according to claim 1.

* * * * *